United States Patent

[11] 3,576,089

[72] Inventor Victor E. Magnuson
 1818 Linden Ave., Mishawaka, Ind. 46544
[21] Appl. No. 697,953
[22] Filed Jan. 15, 1968
[45] Patented Apr. 27, 1971

[54] HONING AND SHARPENING MACHINE
 6 Claims, 7 Drawing Figs.
[52] U.S. Cl............................................... 51/59,
 51/170
[51] Int. Cl....................................... B24b 7/00,
 B24b 9/00, B24b 23/00
[50] Field of Search............................ 51/59,
 170.3, 175, (Inquired)

[56] References Cited
 UNITED STATES PATENTS
 2,370,864  3/1945  Krieger...................... 51/59
 1,241,027  9/1917  Sander....................... 51/59
 3,457,680  7/1969  Kondo........................ 51/59
 2,722,790 11/1955  Smith........................ 51/170.3

*Primary Examiner*—James L. Jones, Jr.
*Attorneys*—Marmaduke A. Hobbs and Kemon, Palmer, Stewart & Estabrook ABSTRACT: A honing and sharpening machine for small tools and instruments such as those used by dentists, having a housing with an upper panel on which is mounted a reciprocal carriage for a honing or sharpening stone. The carriage is supported by a pair of end members rigidly mounted on the panel and is driven by a motor disposed in the housing beneath the carriage. The carriage and stone are reciprocated rapidly by the motor and the stone may be contoured to provide the optimum surface for shaping and reconditioning the tools and instruments.

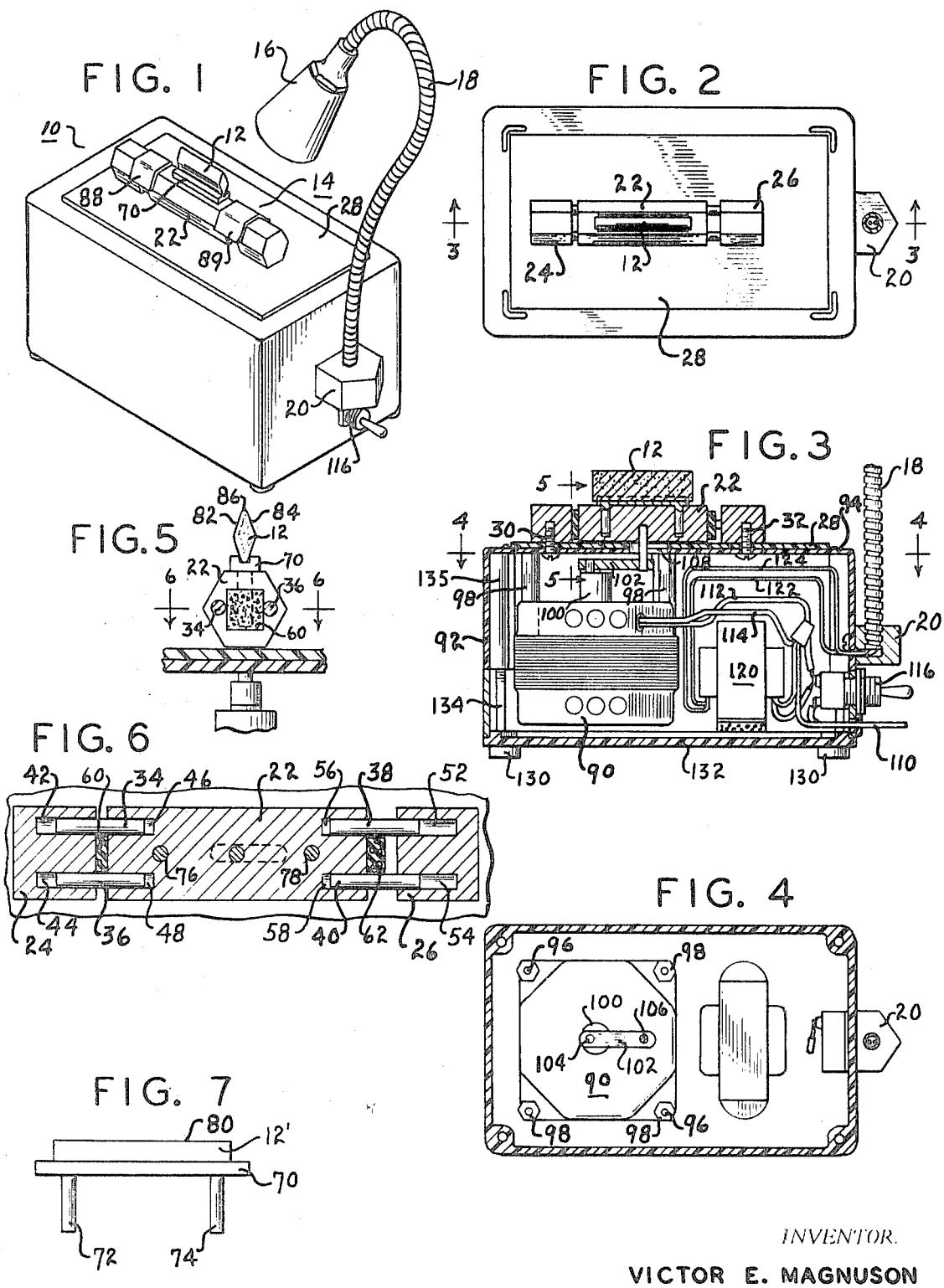

HONING AND SHARPENING MACHINE

The tools used by dentists are specialized instruments having various tip formations which must be sharp or otherwise accurately shaped to the required configuration. The tools often become rapidly worn, dull or misshapen, and the usual practice in the past has been to discard these worn or defective tools rather than sharpening or reconditioning them. Dentists often have the mechanical skill and spare time to repair the tools, but no satisfactory, easily operated machine or device has been available in the past to perform the intricate operations required to properly and effectively recondition the tools. Those that have been available have been primarily merely small grinding wheels or honing stones which were generally ineffective for returning the tools to their original condition and shape. It is therefore one of the principal objects of the present invention to provide a machine for honing, sharpening or otherwise reconditioning small instruments and tools such as those used by dentists, which permits delicate and intricate operations to be accurately performed by a relatively small, rapidly moving stone, and which is so constructed and designed that the movement of the stone does not interfere with the proper positioning of the instruments or tools.

Another object of the invention is to provide a tool or instrument hone or reconditioner of the aforesaid type which is compact, portable and easily handled, and which can effectively be operated with little experience or training.

Still another object of the invention is to provide a relatively simple and accurate honing and sharpening machine for dentist's tools and similar instruments, which can be conveniently used in an office or laboratory without any special installation or service, and which can readily be moved from place to place and easily stored when not in use.

A further object is to provide a machine of the aforementioned type which is so constructed that stones of various configurations or contours can be substituted for one another to provide the optimum stone for any particular honing, sharpening or shaping job, and which is economical to operate and maintain.

Additional objects and advantages of the invention will become apparent from the following description and accompanying drawing, wherein:

FIG. 1 is a perspective view of the complete machine showing one type of stone thereon;

FIG. 2 is a top plan view of the machine shown in FIG. 1 without the lamp;

FIG. 3 is a vertical cross-sectional view, the section being taken on line 3–3 of FIG. 2;

FIG. 4 is a horizontal cross-sectional view, the section being taken on line 4–4 of FIG. 3;

FIG. 5 is an enlarged fragmentary vertical cross-sectional view, the section being taken on line 5–5 of FIG. 3;

FIG. 6 is a horizontal cross-sectional view, the section being taken on line 6–6 of FIG. 5; and FIG. 7 is a side elevational view of a different type of stone from that shown in the preceding FIGS.

Referring more specifically to the drawing and to FIG. 1 in particular, numeral 10 designates generally the present honing and sharpening machine, 12 a stone representing one configuration usable in the present machine, 14 a stone-operating mechanism, and 16 a light mounted on the machine by a flexible stem 18 and bracket 20. While it is advisable to have an effective light, the light may be of various types mounted one way or another on the machine, or it may be from an entirely separate source.

The stone-operating mechanism 14 consists of a carriage 22 of an elongated hexagonal shape supported by end members 24 and 26 secured rigidly to plate 28 by screws 30 and 32, respectively, extending upwardly through plate 28 into the end members. The two end members are spaced relative to the carriage, and the carriage is reciprocally supported between the end members by pins 34 and 36 extending into end member 24, and pins 38 and 40 extending into end member 26. The pins 34 and 36 are preferably in floating relationship in bores 42 and 44 in end member 24 and bores 46 and 48 in the respective end of carriage 22, and pins 38 and 40 are in floating relationship in bores 52 and 54 in the end member 26, and bores 56 and 58 in the respective end of the carriage. This structure retains the carriage in a fixed path as it reciprocates between the two end members and permits rapid operation of the carriage without rotation and without vibration, chatter or the like. The movement of the carriage is limited by resilient means or pads 60 and 62 between end members 24 and 26 and their respective ends of the carriage, the pads preferably being secured either to the carriage or the end member by cement or other suitable securing means.

The stone 12 is rigidly secured to a base 70 which is removably mounted on carriage 22 by pins 72 and 74 joined to the base and extending downwardly therefrom. The pins seat in bores 76 and 78, respectively, and can readily be inserted in and withdrawn from the bores for mounting the stone on and demounting it from carriage 22. The two pins preferably fit rather snugly in the respective bores 76 and 78 so that no play will occur between the stone assembly and the carriage when the machine is in operation. Various-shaped stones may be used such as the diamond-shaped stone 12 shown in FIGS. 1, 2, 3 and 5 and the rectangular-shaped stone 12' shown in FIG. 7, the latter having a flat upper surface 80 as distinguished from the angular or pointed surfaces 82 and 84 with the ridge 86 therebetween of stone 12. While the stones are normally for honing, sharpening or reshaping the instruments or tools, the stones may be sufficiently coarse to perform a grinding operating. Since a small amount of dust or other debris is produced during a honing or sharpening operation, shields 88 and 89, extending over the spaces between the carriage and end members, are secured either to the opposite ends of the carriage or to the end members 24 and 26 and prevent the debris from falling onto the sliding pins 34, 36, 38 and 40, and thereby interfering with the free movement thereof in their respective bores.

Carriage 22 is driven by an electric motor 90 disposed in housing 92 and secured to the underside of housing top 94 by bolts 96 extending downwardly through the top to a plurality of posts 98. The motor shaft 100 extends upwardly from the motor and drives a lever 102 connected to the shaft in an offset relation by a pin 104. The opposite end of lever 102 is connected to carriage 22 by a pin 106 extending upwardly from the lever through a slot 108 in top 94 and panel 28 into the underside of the carriage. Pin 104 rotates freely relative to lever 102 as shaft 100 rotates, thus causing lever 102 to reciprocate and thereby reciprocating the carriage between the two end members 24 and 26. The carriage is spaced from the upper surface of panel 28 and reciprocates freely on pins 34, 36, 38 and 40 as the motor moves lever 102 between the two extreme positions to the right and left as seen in FIG. 3. The motor is supplied with power through leads 110, 112 and 114, lead 112 being connected to a switch 116 which controls the operation of the motor. The lamp is connected to lead 110 and switch 116, and with a transformer 120 by leads 122 and 124. The switch controls both the operation of the motor and the lights so that when the motor is turned on, the lights will likewise be turned on. The motor and transformer are enclosed in housing 92, which is preferably mounted on a plurality of resilient legs 130 for reducing the effect of any vibration in the machine. As shown in the drawing, the housing is closed by a bottom plate 132 which is secured in place by a plurality of bolts 134 extending upwardly through the bottom into the housing into bosses 135.

In the operation of the present honing and sharpening machine, a stone of the desired configuration, such as those shown at numerals 12 and 12', is mounted on carriage 22, and the motor and lights are turned on by the operation of switch 116. As the motor rotates, lever 102 reciprocates, causing carriage 22 to reciprocate between end members 24 and 26. As the carriage reciprocates, it contacts resilient pads 60 and 62, which not only prevent the abrupt termination of each stroke of the carriage, but in effect soften the ends of the strokes and assist in reversing the carriage into the opposite direction. While rubber or rubberlike material is shown as the resilient means, small springs may be used if desired. With the stone reciprocating rapidly as the motor drives carriage 22, the operator places the tool or instrument on the stone and sharpens, shapes or otherwise reconditions the tip of the tool or instrument. Since the stone is reciprocating very rapidly, it assumes the appearance of a stationary object which permits the operator to carefully and precisely position the tool or instrument tip on the honing or cutting surface of the stone. Further, in view of the nature of the reciprocating movement of the stone, flat, angular or various other shapes can readily be utilized without interference from other curvatures not required for performing the desired operation.

While only one embodiment of the present machine has been described in detail herein, various changes and modifications may be made without departing from the scope of the invention.

I claim:

1. A honing and sharpening machine for small tools and instruments, comprising an elongated reciprocating carriage, an elongated stone on top of said carriage, means for removably mounting said stone on said carriage, support members at each end of said carriage, a plurality of pins disposed in each end of the carriage and in their respective support member for connecting said carriage to said end members for movement relative thereto, a motor beneath said carriage, a means driven by said motor and connected to said carriage for rapidly reciprocating said carriage between said end members, and a housing having an upper surface forming a rest for steadying the tools while being sharpened.

2. A honing and sharpening machine as defined in claim 1 in which resilient reaction members are positioned between the ends of said carriage and said support members to assist in reversing the motion of said carriage.

3. A honing and sharpening machine as defined in claim 2 in which said resilient members are pads of rubberlike material secured to the ends of said carriage.

4. A honing and sharpening machine as defined in claim 1 in which the means driven by said motor includes a generally reciprocating lever, a pin connecting one end of said lever to said carriage, and a pin connected to the other end of said lever and to the motor shaft in axially off set relation.

5. A honing and sharpening machine as defined in claim 3 in which said means driven by said motor includes a generally reciprocating lever, a pin connecting one end of said lever to said carriage, and a pin connected to the other end of said lever and to the motor shaft in axially off set relation therefrom.

6. A honing and sharpening machine as defined in claim 1 in which said stone is attached to a base and said means for removably mounting said stone consists of a pair of spaced pins secured to the underside of said base and seating in spaced holes in said carriage.